(12) United States Patent
Rohleder et al.

(10) Patent No.: US 8,650,440 B2
(45) Date of Patent: Feb. 11, 2014

(54) PROCESSOR BASED SYSTEM HAVING ECC BASED CHECK AND ACCESS VALIDATION INFORMATION MEANS

(75) Inventors: Michael Rohleder, Unterschleissheim (DE); Gary Hay, Motherwell (GB); Stephan Mueller, Taunusstein (DE); Manfred Thanner, Neubiberg (DE)

(73) Assignee: Freescale Semiconductor, Inc., Austin, TX (US)

( * ) Notice: Subject to any disclaimer, the term of this patent is extended or adjusted under 35 U.S.C. 154(b) by 500 days.

(21) Appl. No.: 12/811,454

(22) PCT Filed: Jan. 16, 2008

(86) PCT No.: PCT/IB2008/050149
§ 371 (c)(1),
(2), (4) Date: Jul. 1, 2010

(87) PCT Pub. No.: WO2009/090502
PCT Pub. Date: Jul. 23, 2009

(65) Prior Publication Data
US 2010/0287443 A1 Nov. 11, 2010

(51) Int. Cl.
*G06F 11/00* (2006.01)
(52) U.S. Cl.
USPC .................................. 714/11; 714/52; 712/43
(58) Field of Classification Search
USPC ............. 714/10–13, 52; 700/3–5; 712/20, 43, 712/220, 229; 713/375
See application file for complete search history.

(56) References Cited

U.S. PATENT DOCUMENTS

| | | | |
|---|---|---|---|
| 4,823,256 A * | 4/1989 | Bishop et al. .................... 714/10 |
| 5,095,485 A | 3/1992 | Sato | |
| 5,136,704 A | 8/1992 | Danielsen et al. | |
| 5,226,152 A | 7/1993 | Klug et al. | |
| 5,689,689 A * | 11/1997 | Meyers et al. ................. 713/375 |
| 5,860,014 A * | 1/1999 | Cheong et al. ................. 710/260 |
| 6,201,997 B1 | 3/2001 | Giers | |
| 6,275,752 B1 | 8/2001 | Giers | |
| 6,502,019 B1 | 12/2002 | Zydek et al. | |
| 6,625,749 B1 * | 9/2003 | Quach ............................. 714/10 |
| 6,640,313 B1 * | 10/2003 | Quach ............................. 714/10 |
| 6,772,368 B2 * | 8/2004 | Dhong et al. .................... 714/11 |
| 7,328,371 B1 * | 2/2008 | Kalyanasundharam et al. ............................... 714/11 |

(Continued)

FOREIGN PATENT DOCUMENTS

| | | |
|---|---|---|
| EP | 0747803 A | 12/1996 |
| EP | 0915789 B1 | 7/2002 |
| EP | 0979189 B1 | 8/2006 |
| EP | 1742152 A | 1/2007 |
| EP | 1588380 B1 | 3/2009 |
| WO | 95/15518 A1 | 6/1995 |
| WO | 97/06487 A1 | 2/1997 |
| WO | 2005/045664 A2 | 5/2005 |
| WO | 2005/045665 A1 | 5/2005 |
| WO | 2005/081107 A1 | 9/2005 |
| WO | 2007/017369 A | 2/2007 |
| WO | 2008/061558 A1 | 5/2008 |

OTHER PUBLICATIONS

International Search Report and Written Opinion correlating to PCT/IB2008/050149 dated Jul. 4, 2008.

*Primary Examiner* — Scott Baderman
*Assistant Examiner* — Joseph Kudirka

(57) ABSTRACT

A system comprises a first master element; and at least one shared communication element arranged to operably couple the first master element to at least one slave element. The system further comprises at least one validation element located on at least one further validation path located between the first master element and the at least one slave element, wherein the at least one validation element is arranged to validate at least one of: at least one access request by the first master element; and a response to an access request from the at least one slave element.

19 Claims, 8 Drawing Sheets

(56) References Cited

U.S. PATENT DOCUMENTS

| | | |
|---|---|---|
| 2002/0073357 A1 | 6/2002 | Dhong et al. |
| 2006/0161918 A1 | 7/2006 | Giers |
| 2006/0190702 A1* | 8/2006 | Harter et al. ............. 712/15 |
| 2006/0218432 A1 | 9/2006 | Traskov et al. |
| 2007/0043972 A1* | 2/2007 | Graham et al. ............. 714/12 |
| 2007/0245133 A1* | 10/2007 | Weiberle et al. ............ 712/229 |
| 2008/0163031 A1* | 7/2008 | Hsieh et al. ............. 714/773 |
| 2010/0107025 A1 | 4/2010 | Sadaka et al. |

* cited by examiner

PROCESSOR BASED SYSTEM HAVING ECC BASED CHECK AND ACCESS VALIDATION INFORMATION MEANS

FIELD OF THE INVENTION

The field of the invention relates to a system architecture and apparatus therefor, and in particular to a system architecture configurable to provide a plurality of safety integrity levels.

BACKGROUND OF THE INVENTION

Safety requirements for automotive electronics are being standardized in a number of application segments. An example are chassis applications which United States government legislation requires to be standardized for each new vehicle from 2012. A further example is electric power steering.

Automotive braking applications and steering applications also both require sophisticated electronic solutions that allow switching to a safe state in case a malfunction is detected. Accordingly, awareness of safety issues, for example by a system-on-chip (SoC), is of increasing importance in today's vehicular applications, although the usage of such devices is not limited to such applications. However, the safety level required differs from application to application. For example, some applications may require Safety Integrity Level (SIL) 3, whilst other applications may require SIL 2. Safety Integrity Levels are defined as a relative level of risk-reduction provided by a safety function, or as a specific target level for risk reduction. Four SIL levels are defined by the International Standard IEC 61508, ranging from SIL 4, being the most dependable, to SIL 1, being the least dependable.

Different levels of safety may require varying amounts of redundancy of building blocks and connectivity within the SoC. As a result of this, known SoCs are designed with a specific SIL in mind. Thus, for applications requiring different levels of safety, different SoCs must be developed. Since redundancy of the building blocks is usually tightly coupled to the architecture of the SoC, this is an issue for creating a family of safety aware devices.

However, the need to develop multiple SoC architectures to support multiple SILs makes the development of safety aware devices complex and costly.

SUMMARY OF THE INVENTION

In accordance with aspects of the invention, there is provided a system and a semiconductor device as defined in the appended Claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DESCRIPTION OF EMBODIMENTS

Embodiments of the invention will be described in terms of a system-on-chip (SoC) comprising two or more bus master devices, a communication component in the form of a crossbar switch and a plurality of slave devices. Although embodiments of the invention will be described in terms of a system-on-chip (SoC), it will be appreciated that the inventive concept herein described may be embodied in any apparatus that incorporates two or more bus master devices.

Figure 1:
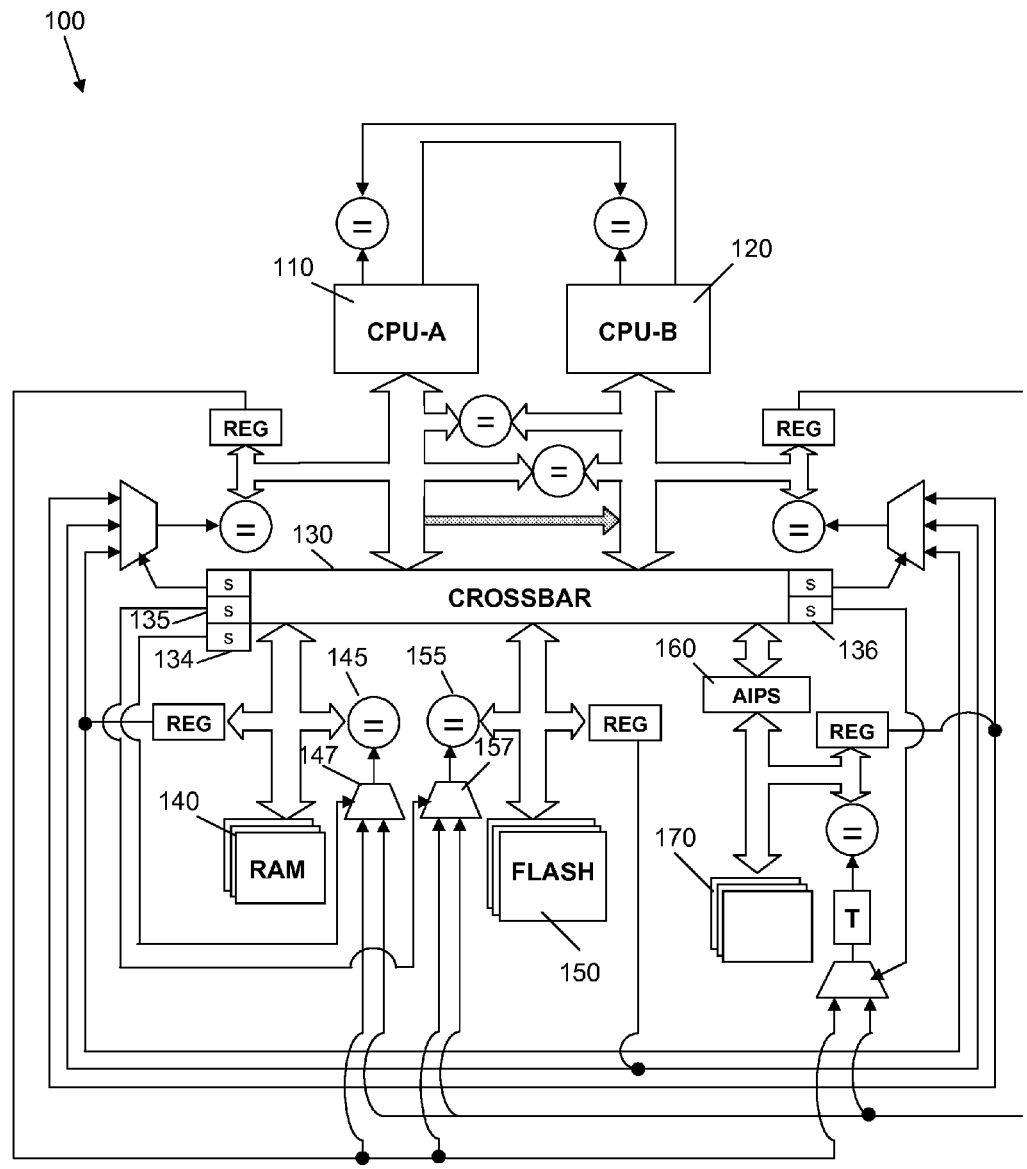
FIGS. 1 to 6 shows architectures of examples of embodiments of a system in accordance with the invention.

Referring to FIG. 1, there is illustrated an architecture for a system 100 according to an embodiment of the invention. As shown, the system may comprise a first master element and one or more shared communication element arranged to operably couple the first master element to one or more slave element. The system may further comprise one or more validation element located on one or more further validation path located between the first master element and the one or more slave element, wherein the one or more validation element is arranged to validate one or more of: one or more access request by the first master element; and a response to an access request from the one or more slave element.

In the example of an embodiment illustrated in FIG. 1, the first master element and a second master element are Central Processing Units (CPU) CPU-A 110 and CPU-B 120 respectively. The system 100 further comprises a communication element, which in the example is a crossbar switch 130, arranged to operably couple CPU-A 110 and CPU-B 120 to one or more slave element. For the embodiment illustrated in FIG. 1, the system 100 comprises a first slave element in the form of Random Access Memory (RAM) 140, a second slave element in the form of FLASH memory 150, and a bus bridge 160, via which peripheral slave elements 170 may be operably coupled to the CPU-A 110 and CPU-B 120 over the crossbar switch 130. As will be appreciated by a skilled artisan, the bus bridge 160 may be omitted, e.g. when both master and peripheral slave elements use the same protocol.

It will be appreciated by a skilled artisan that the invention is independent from any bus protocol used, and the usage of specific bus protocols in the described embodiments are only for illustrative purposes. By way of example, the system 100 may comprise an Advanced Microcontroller Bus Architecture (AMBA) crossbar switch 130, and the peripheral slave elements 170 may comprise IP Skyblue (IPS) peripherals. IP Skyblue™ is a proprietary bus protocol standardized, defined, and used by Freescale Semiconductor Inc™ of Austin, Tex., United States. A bus bridge ATPS (AMBA to IPS) 160 may then be used to convert the AMBA protocol to the IPS protocol, and vice-versa.

It should be noted that a usage of bus bridges for RAM or Flash blocks is not shown in FIG. 1, for sake of simplicity. However, it will be apparent that such bus bridges may be present if suitable.

The system 100 is arranged to operate in a first, independent mode, wherein CPU-A 110 and CPU-B 120 operate substantially independently of one another. The system 100 is further arranged to operate in a second, redundant mode, where both CPU-A 110 and CPU-B 120 receive the same instructions and therefore perform the same operations. The provision of two master elements performing the same operations is often referred to in terms of the two master elements operating in "Lock Step" and may be used to have two bus masters cross-check each others operations.

Figure 2:
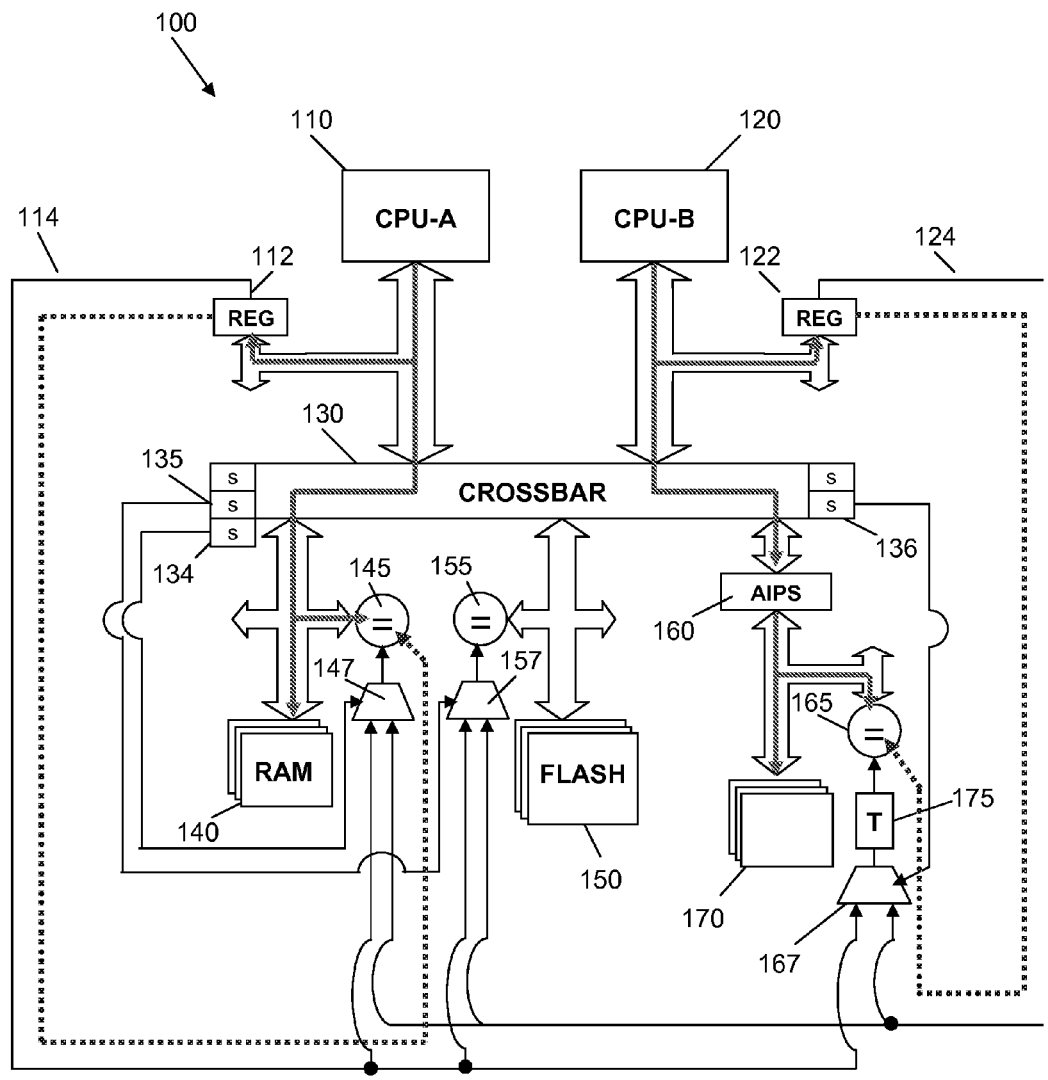

FIG. 2 illustrates an example of CPU-A 110 and CPU-B 120 of the system 100 of FIG. 1 operating in the first, independent mode, during a master-to-slave information flow.

The master-to-slave information flow may for example comprise a master element performing a write operation, or the first part of a read operation or a master element performing a read access request operation.

For the example illustrated in FIG. 2, CPU-A 110 may for example send data to be written (along with the required access properties, e.g. address, size, etc.) to RAM 140 via the crossbar switch 130. Thus, the crossbar switch 130 routes the received data to RAM 140. Substantially concurrently, CPU-B 120 requests information to be read from a peripheral slave element 170 via the crossbar switch 130, which routes the read access request to bus bridge 160. For the illustrated embodiment, the bus bridge 160 converts the AMBA protocol read access request into an IPS bus protocol or data request, and forwards the converted the data request the appropriate peripheral slave element 170.

As will be appreciated by a skilled artisan, a read access request may comprise a similar format to a write access, and as such comprises access properties, such as address, size, etc, and data. However, for a read access request, such data provided is typically meaningless, and may be ignored.

The system 100 further comprises one or more access validation register per master element, which for the illustrated embodiment is in a form of access validation registers 112, 122, operably coupled to CPU-A 110 and CPU-B 120 respectively. Access validation register 112 is operably coupled generally between CPU-A 110 and the crossbar switch 130. Accordingly, when CPU-A 110 sends access information and/or data to be written to a slave element, for example RAM 140, access validation register 112 also receives this information, comprising the access properties and the data to be written. Access validation register 122 is operably coupled generally between CPU-B 120 and the crossbar switch 130. Accordingly, when CPU-B 120 requests data to be read from a slave element, for example a peripheral slave element 170, access validation register 122 also receives this information, comprising the access properties.

The system 100 further comprises one or more slave comparator. For the illustrated embodiment, system 100 comprises slave comparator 145, operably coupled to RAM 140, generally located between the crossbar switch 130 and RAM 140. For the illustrated embodiment, system 100 further comprises slave comparator 155, operably coupled to Flash 150, located generally between the crossbar switch 130 and Flash 150. A third slave comparator 165 is operably coupled to, for the illustrated embodiment, the IPS side of the bus bridge 160, generally located between the bus bridge 160 and one or more peripheral slave element(s) 170. In this manner, when data is written to or read from RAM 140 or FLASH 150, the corresponding slave comparator 145, 155 respectively also receives the access information, which for the case of a write access also comprises data to be written (which may be in a condensed form). Furthermore, when data is written to or read from the one or more peripheral slave element(s) 170, via bus bridge 160, the slave comparator 165 also receives the related access information, which in the case of a write access also comprises data to be written The access validation register 112 is operably coupled to each slave comparator 145, 155, 165 to provide an access validation path 114. The access validation register 122 is operably coupled to each slave comparator 145, 155, 165 providing an access validation path 124. Each slave comparator 145, 155, 165 is coupled to each access validation path 114,124 via a multiplexer 147, 157, 167 respectively. Upon recording an access from CPU-A 110, the access validation register 112 provides validation information over the access validation path 114. Likewise, upon recording an access from CPU-B 120, the access validation register 122 provides validation information over the access validation path 124.

Each of the multiplexers 147, 157 and 167 is further operably coupled to a selector 134, 135, 136 respective. Each selector 134, 135, 136 instructs its corresponding multiplexer to select an appropriate validation path 114, 124, and to operably couple the corresponding slave comparator 145, 155, 165 thereto. Thus, for the embodiment illustrated in FIG. 2, a write access of CPU-A 110 to RAM 140 will cause selector 134 to select access validation path 114, enabling slave comparator 145 to perform validation of the access information. A read access of CPU-B 120 to one of the peripheral slave elements 170 causes the selector 136 to instruct the multiplexer 167 to select access validation path 124, as also illustrated in FIG. 2, enabling slave comparator 165 to perform validation of the access information.

In one embodiment, a translator 175 may also be provided between multiplexer 167 and slave comparator 165. In this embodiment, translator 175 converts the information provided by, for example, access validation register 122 into an appropriate format corresponding to a format of information generated by the bus bridge 160 and expected by one or more peripheral slave element 170. Such a translator may only be required when the protocol recorded by an access validation register uses a different information encoding from the protocol received by the corresponding peripheral slave comparator. For example, access information recorded by access validation register 122, and originating from CPU-B, may be in an AMBA format, and comprise information relating to address, size, etc. Accordingly, validation information provided over validation path 124 by access validation register 122 will relate to the AMBA access information. Translator 175 may then convert the AMBA access information (address, size, etc.) into a corresponding IPS format, (module enables, address offset, byte enables, etc.).

As will be appreciated by a skilled artisan, access validation register 112, access validation path 114, multiplexer 147 and slave comparator 145 provide an independent means of validating the transfer of access information from CPU-A 110 to RAM 140. When the slave comparator 145 determines that an error is present in the write data or other provided information, then appropriate action can be taken. In this manner, the relative level of risk in writing data to memory can be substantially reduced, since errors in the transfer of data can be detected. Usual countermeasures of a system to such errors may include, by way of example, aborted operations, interrupts or exceptions or a request to replay the related operation.

The validation information may for example be a complete copy of the access information (address, data, and access properties, e.g. size, modes, etc.), while in other embodiments the validation information may be reduced to only a portion of this information or a derivative of the access information such as a checksum calculated for this data. Accordingly, the validation information may comprise one or more of a substantially complete copy of the access information; a portion of the access information such as an access address, data, or access properties such as size, modes, etc; and a derivative of the access information, such as a checksum.

Furthermore, the validation process performed by the slave comparator may be a simple comparison of both available information (write data, and information provided over the access validation path) or can be significantly more complex (e.g. calculation of a checksum), dependent on the amount and encoding of the access information being provided.

Figure 3:
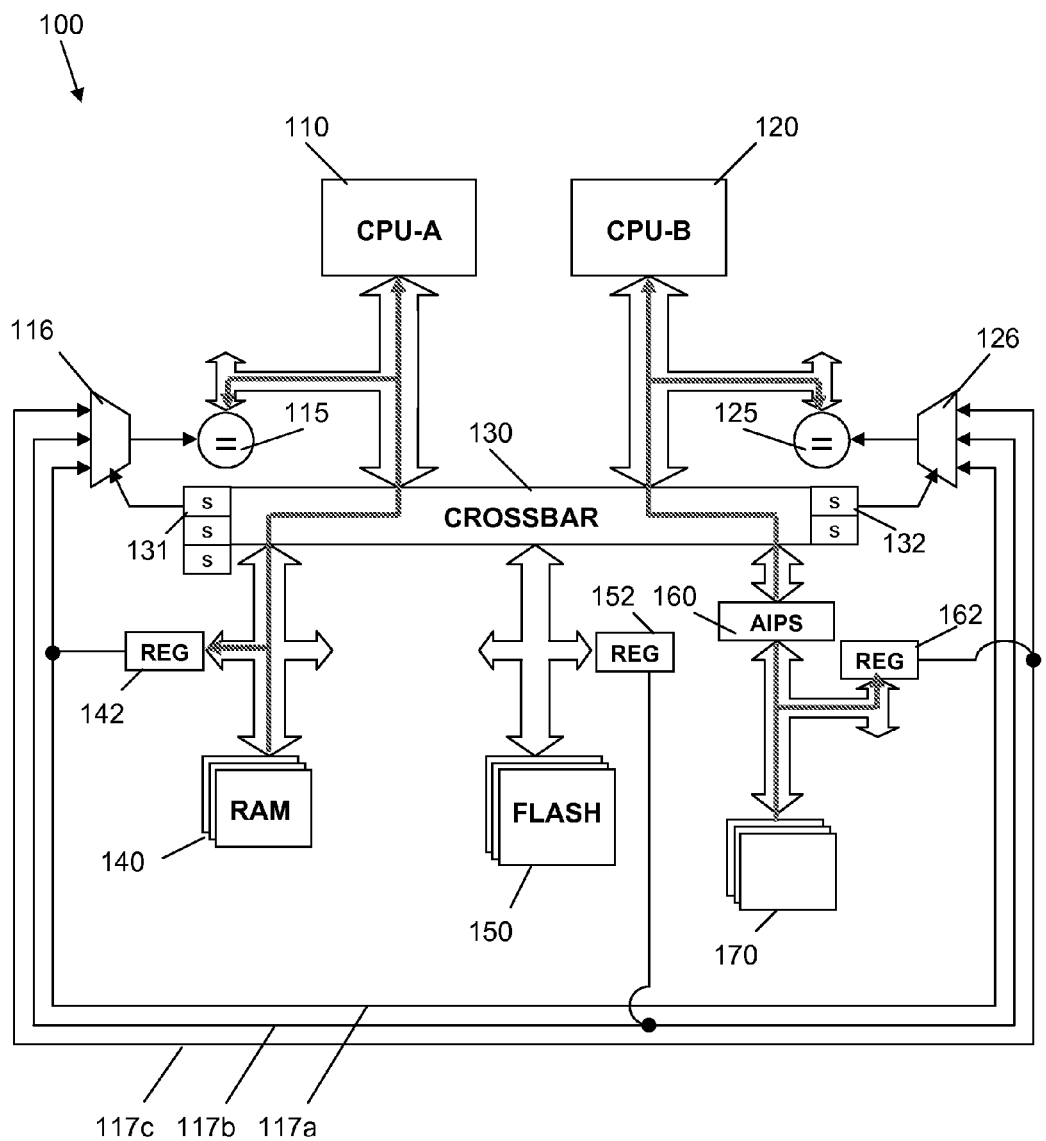

Referring now to FIG. 3, there is illustrated an example of CPU-A 110 and CPU-B 120 of the system 100 of FIG. 1, operating in the first, independent mode during a slave-tomaster information flow. For clarity, a slave-to-master information flow may comprise a second part of a read access, where the requested data is provided by the slave element and transferred to the requesting master element.

For the example illustrated in FIG. 3, CPU-A 110 is performing a read operation from RAM 140. Data to be read is provided by the RAM 140 to the crossbar switch 130, which routes the requested data back to CPU-A 110. The system 100 further comprises read validation registers, which for the illustrated embodiment are in a form of read validation registers 142, 152, 162, operably coupled between RAM 140, FLASH 150 and one or more peripheral slave element 170 respectively, and the crossbar switch 130, or the bus bridge 160. Thus, for the example illustrated in FIG. 3, the read validation register 142 records read data to be sent via the crossbar switch 130 from RAM 140.

The system 100 further comprises one or more read comparator. For the illustrated embodiment, system 100 comprises read comparator 115, operably coupled to CPU-A 110, generally between CPU-A 110 and the crossbar switch 130. The system 100 further comprises read comparator 125, operably coupled to CPU-B 120, generally between CPU-B 120 and the crossbar switch 130. Thus, for the example illustrated in FIG. 3, when the data to be read is routed to CPU-A 110 by crossbar switch 130, read comparator 115 also records the data. The read comparator 115 is further operably coupled to each of the read validation registers 142, 152, 162 via multiplexer 116, providing read validation paths 117a, 117b and 117c respectively. The read comparator 125 is operably coupled to each of the read validation registers 142, 152, 162 via multiplexer 126 and again read validation paths 117a, 117b and 117c respectively. Upon receipt of read data, read validation registers 142, 152, 162 provide validation information over read validation paths 117a, 117b, 117c respectively, to multiplexers 116, 126.

In this manner, for the example illustrated in FIG. 3, upon receipt of data to be read, read validation register 142 sends validation information over read validation path 117a to multiplexers 116 and 126. The crossbar switch 130, upon receipt of data to be read by CPU-A 110, routes the received data to CPU-A 110. Each of the multiplexers 116, 126 is operably coupled to a selector 131, 132 respectively. The selector 131 instructs multiplexer 116 to couple the read comparator 115 to the read validation path 117a. In this manner, the read comparator 115 receives the data to be read by CPU-A 110 and the validation information from the read validation register 142. The read comparator 115 is then able to validate the data being read using the validation information.

As also illustrated in FIG. 3, CPU-B 120 is performing a read operation from a peripheral slave element 170. Data to be read is provided by the peripheral slave element 170 to the crossbar switch 130, via the bus bridge 160, which routes the requested data back to the CPU-B 120.

When the data is sent from the one or more peripheral slave element 170, read validation register 162 records the data, and sends validation information over read validation path 117c to multiplexers 116 and 126. Furthermore, when the data to be read is routed to CPU-B 120, read comparator 125 also records the data to be read.

For the embodiment illustrated in FIG. 3, selector 132 instructs multiplexer 126 to couple the read comparator 125 to, for the illustrated example, read validation path 117c. In this manner, the read comparator 125 receives the data to be read by CPU-B 120 and the validation information from the read validation register 162. The read comparator 125 is then able to validate the data, etc. in the aforementioned manner using the validation information.

As will be appreciated by a skilled artisan, read validation register 142, read validation path 117a and read comparator 115 provide a means of validating the data transfer of a read access from RAM 140 to CPU-A 110. In this manner, the relative level of risk in reading data from, say, memory can be substantially reduced, since errors in the transfer of data can be detected. When the read comparator 142 determines that an error is present in the data being read, the appropriate action may be taken, as hereinbefore described.

The validation information provided by a read validation register and used by a read comparator may be a copy of the read data, or any reduced form thereof, or a simple checksum. Since this part of a read transfer is rather common for all protocols, a translator block may not be required, even in cases where the transmission uses multiple protocols.

Figure 4:
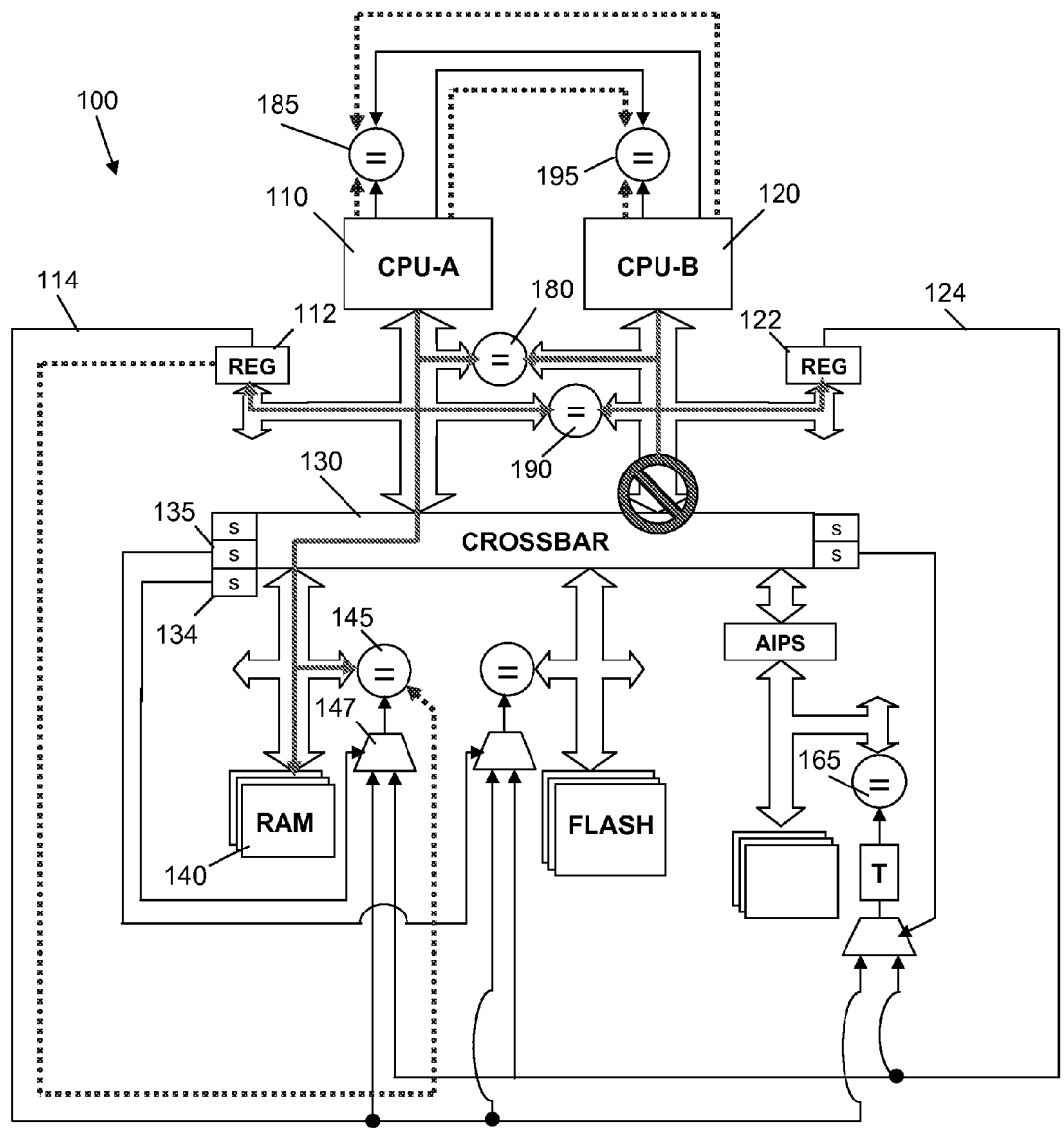

Referring now to FIG. 4, there is illustrated an example of CPU-A 110 of FIG. 1 during a master-to-slave information flow whilst the system 100 is operating in the second, "redundant" mode. In a similar manner as for the example illustrated in FIG. 2, where system 100 is operating in the first, independent mode, CPU-A 110 sends data to be written to RAM 140 via the crossbar switch 130. The crossbar switch 130 then routes the data to RAM 140. Validation of the data transfers between CPU-A 110 and, for the illustrated embodiment, RAM 140 is provided by access validation register 112, access validation path 114, multiplexer 147 and slave comparator 145, in a similar way as previously described with reference to FIG. 2, When the system 100 is operating in the second, redundant mode, CPU-B 120 performs in each processor cycle substantially the same operations as CPU-A 110. Consequently, for the example illustrated in FIG. 4, CPU-B 120 also sends data to be written to RAM 140 via the crossbar switch 130. In this manner, CPU-B 120 is running in Lock Step with CPU-A 110. However, when running redundantly in 'Lock Step' with CPU-A, access from CPU-B 120 to the crossbar switch 130 is blocked. This prevents conflicting accesses, and permits other masters (e.g. DMA, not shown in this example) to run concurrently to both processors running in 'Lock Step'.

For the illustrated embodiment, both CPUs 110, 120 are further coupled to one another via one or more validation element, which for the illustrated embodiment comprises CPU comparator 180, operably coupled to CPU-A 110, and CPU comparator 190 operably coupled to CPU-B 120.

Using two distinct comparators provides the benefit of redundancy within the validation element, each comparator 180, 190 validating the other. Each comparator 180, 190 compares the outputs of the attached CPU 110, 120 with the outputs of the other CPU 120, 110 and will initiate an appropriate action in case of mismatches.

When master elements CPU-A 110 and CPU-B 120 are operating in redundant mode, access to internal storage elements of each of the master elements, for example register files, control registers, etc, may also be compared for validation purposes, for example via validation elements 185, 195, in addition to validation of external read/write operations from/to slave elements, etc. In this manner, an improved safety integrity level may be achieved within the system.

As will be appreciated by a skilled artisan, the system architecture described in the illustrated embodiments supports several configurations for master redundancy (single master, two masters crosschecking each other, etc.). The term 'horizontal redundancy' is used to refer to blocks that are implemented or used redundantly; the related elements can be master elements (e.g. CPU-A 110, CPU-B 120, etc.) as well as slave elements (e.g. RAM 140, Flash 150, Peripherals 170 etc.). Redundancy of the connectivity is achieved by the additional validation paths, in contrast with existing architectures that comprise full replication of the crossbar and duplication of all accesses. The term 'vertical redundancy' is used to refer to connectivity between master and slave elements within a system that is implemented or used in a manner that permits redundant transmission of the related information. It does not necessarily identify a full replication of the related connectivity, but might also refer to equivalent functionality supporting such a redundant transmission.

Furthermore, a person skilled in the art will appreciate that the system architecture described in the illustrated embodiments also provides redundant connectivity with appropriate validation means for a system where the master elements are running independently. When the correct behaviour of the single core is validated by other means, such as by a core-self test, then the same or a similar level of validation and redundancy may be achieved. Optionally combining these other means with master redundancy can then result in an even higher grade of safety awareness.

Figure 5:
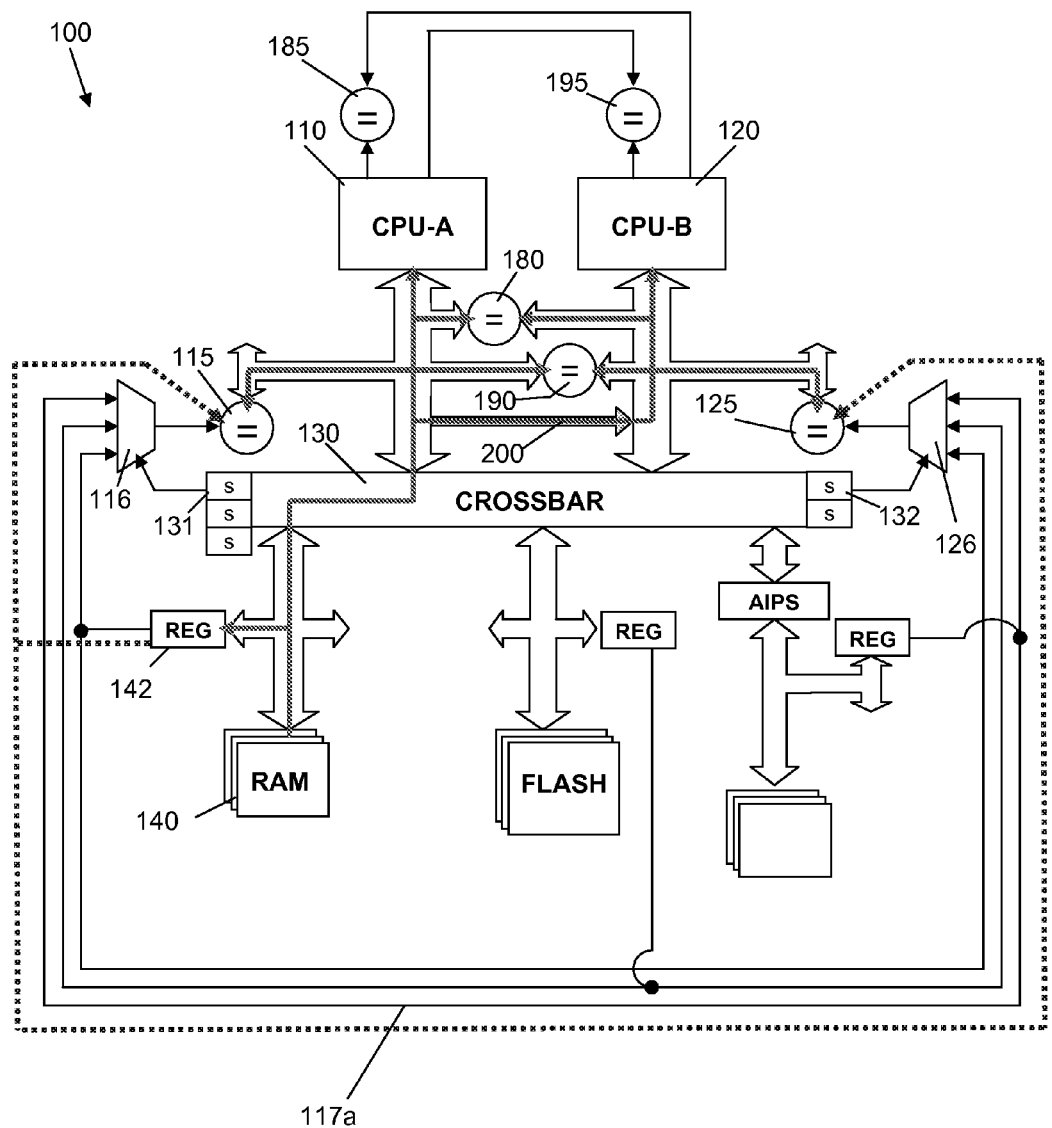

Referring now to FIG. 5, there is illustrated an example of CPU-A 110 of the system 100 of FIG. 1 during a slave-to-master information flow, for example during a second part of a read operation whilst operating in the second, redundant mode.

In a similar way as for the example illustrated in FIG. 3, CPU-A 110 performs a read operation from RAM 140. The data to be read is sent via the crossbar switch 130 from RAM 140, and then routed to CPU-A 110. Validation of the data transfer between RAM 140 and CPU-A 110 is provided by read validation register 142, validation path 114, multiplexer 116 and read comparator 115, in a similar way as previously described with reference to FIG. 3. As previously mentioned, the second CPU (e.g. CPU-B 120) performs similar operations as the first CPU (CPU-A 110) when operating in redundant mode. However, in contrast to earlier safety architectures, the second CPU does not need to perform a complete access over a second crossbar to a (more or less) duplicated set of system resources to achieve a fully redundant access. Since the additional validation paths described in FIG. 2 and FIG. 3 provide a redundant connectivity, the purpose of the second CPU-B 120 may be limited to a redundant verification of the operations of the first CPU-A 110. This is achieved by blocking any access requests from CPU-B 120 to the crossbar 130, as described with reference to FIG. 4.

To remain synchronized, the second CPU-B 120 may essentially process the same data as the first CPU-A 110 in redundant mode, even though its request has been blocked. A bypass path 200 from the connection between the crossbar 130 and the CPU-A 110 to the connection between the crossbar switch 130 and the CPU-B 120 provides the result of a read access over the crossbar switch 130 to CPU-B 120. The validation of this data may also be provided by read validation register 142, validation path 124, multiplexer 126 and read comparator 125, in a similar way as previously described with reference to FIG. 3.

A skilled artisan will appreciate that both operations (blocking accesses by the second master element, and forwarding read results from the first master element) are substantially the minimum requirements for a second master element to run redundantly. Comparators 180 and 190 may be arranged to validate a consistency of operation between CPU-A 110 and CPU-B 120. By turning off these features, an independent execution of each master element may be provided without any further overhead. Therefore, in this manner, switching from redundant to independent mode can be easily achieved, even during runtime.

As previously mentioned, the system 100 may comprise a first master element, such as CPU-A, one or more further master elements, such as CPU-B, the first master element and the one or more further master elements configurable to operate substantially independently of one another in a first, independent mode, and one or more communication elements, such as crossbar switch 130, arranged to operably couple the first master element and the one or more further master elements to one or more slave elements. The first master element and the one or more further master elements are further configurable to operate in a second, redundant mode, wherein the one or more further master elements perform similar operations as the first master element(s). The first master element(s) is further coupled to the one or more further master element via one or more validation element, the one or more validation element arranged to validate operations performed by the first master element with those performed by the one or more further master element when the first master element and the one or more further master element are configured to operate in the second, redundant mode.

In this manner, redundancy of the master elements is a property of the master elements, as opposed to being defined by the system architecture as a whole. In particular, the comparison or validation of the operations of the master elements, when operating in the second, redundant mode, is generally decoupled from data paths and the like. Accordingly, the master elements are not limited to operating solely in an independent mode or solely in a redundant mode, but are capable of being configured to operate in either mode.

Thus, in this manner, a single system architecture is capable of providing a plurality of safety integrity levels, wherein one or more lower safety integrity level application may utilise the system operating in a first, independent mode, whilst one or more higher safety integrity level application may utilise the system operating in the second, redundant mode. In this manner, when the system is operating in the first, independent mode, each master element is able to perform load/store operations etc. independently, enabling greater performance of the overall system. Conversely, when the system is operating in the second, redundant mode, the one or more further master element provides redundancy for the first master element by duplicating all operations of the first master element.

Furthermore, by enabling the master elements to provide redundancy for other master elements, in a manner that is substantially decoupled from data path redundancy, the master element providing the redundancy is advantageously not fixed by the system architecture and can be selected accordingly. As such, each master element may be configured to provide redundancy for one or more other master element, or configured to operate independently.

Additionally, by providing one or more validation element operably coupled to the master elements, validation of master element operations may be performed directly from the master elements, enabling validation to be performed as early as possible. Furthermore, such horizontal redundancy and validation enables a possibility of detected discrepancies, etc. being caused by intermediary elements within the system, to be substantially reduced.

The embodiment illustrated in FIGS. 1 to 5, inasmuch as the provision of validation paths 114, 124, 117a-c, validation registers 112, 122, 142, 152, 162 and comparators 115, 125, 145, 144, 165 coupled thereto, provide an advantage that full checking of all transmitted information can be accomplished without fully duplicating the actual transmission. In particular, providing such vertical redundancy within the system 100 enables flexibility within an operation of the master elements, and in particular enables master elements to operate independently or in redundant mode. Furthermore the validation path can also be used for validating accesses in the independent mode, providing also some safety coverage in this mode.

Although for the illustrated embodiment, RAM 140 and FLASH 150 are provided with separate read validation registers 142, 152, separate slave elements may share a read validation register, as long as a number of slave elements is less than a number of concurrent accesses that the read validation register is capable of handling.

Additionally, each CPU 110, 120 is coupled to a single access validation register 112, 122. However, it is envisaged that pipelined master elements may comprise multiple access validation registers. Furthermore, access validation registers may be reused for other purposes when not required for validating access operations.

For the illustrated embodiment, the master elements, namely CPU-A 110 and CPU-B 120, communicate with slave elements via a common, shared communication element, which for the illustrated embodiment is in a form of a crossbar switch. However, in alternative embodiments, master elements may communicate with slave elements over separate communication elements. Furthermore, master elements, and their respective support units, may be implemented in different areas within, for example, an integrated circuit package or the like, to separate hardware physically.

Furthermore, although separate access validation registers 112, 122 have been described for each of CPU-A 110 and CPU-B 120 of the illustrated embodiment, access validation registers may be shared between multiple master elements. In a case where one or more access validation registers are shared between multiple master elements, a minimum number of such registers required is defined by a maximum number of master accesses supported by the communication element, which for the illustrated embodiment is in the form of the crossbar switch 130.

Similarly, although separate slave comparator blocks 145, 155, 165 have been described for each slave element of the illustrated embodiment, slave comparator blocks may be shared between multiple slave elements. In a case where one or more slave comparator blocks are shared between multiple slave elements, the minimum number of slave comparator blocks required is defined by a maximum number of concurrent accesses supported by the communication element, which for the illustrated embodiment is in a form of the crossbar switch 130.

It is further contemplated that additional comparator blocks may be provided to enhance the detection of erroneous behaviour. By way of example, one or more comparators may be provided to write ports of corresponding register sets, such as access validation registers 112, 122. In this manner, an earlier detection of discrepancies between master-to-slave information flow from CPU-A 110 and CPU-B 120 may be achieved, facilitating an ability for the system to locate erroneous behaviour.

Figure 6A:
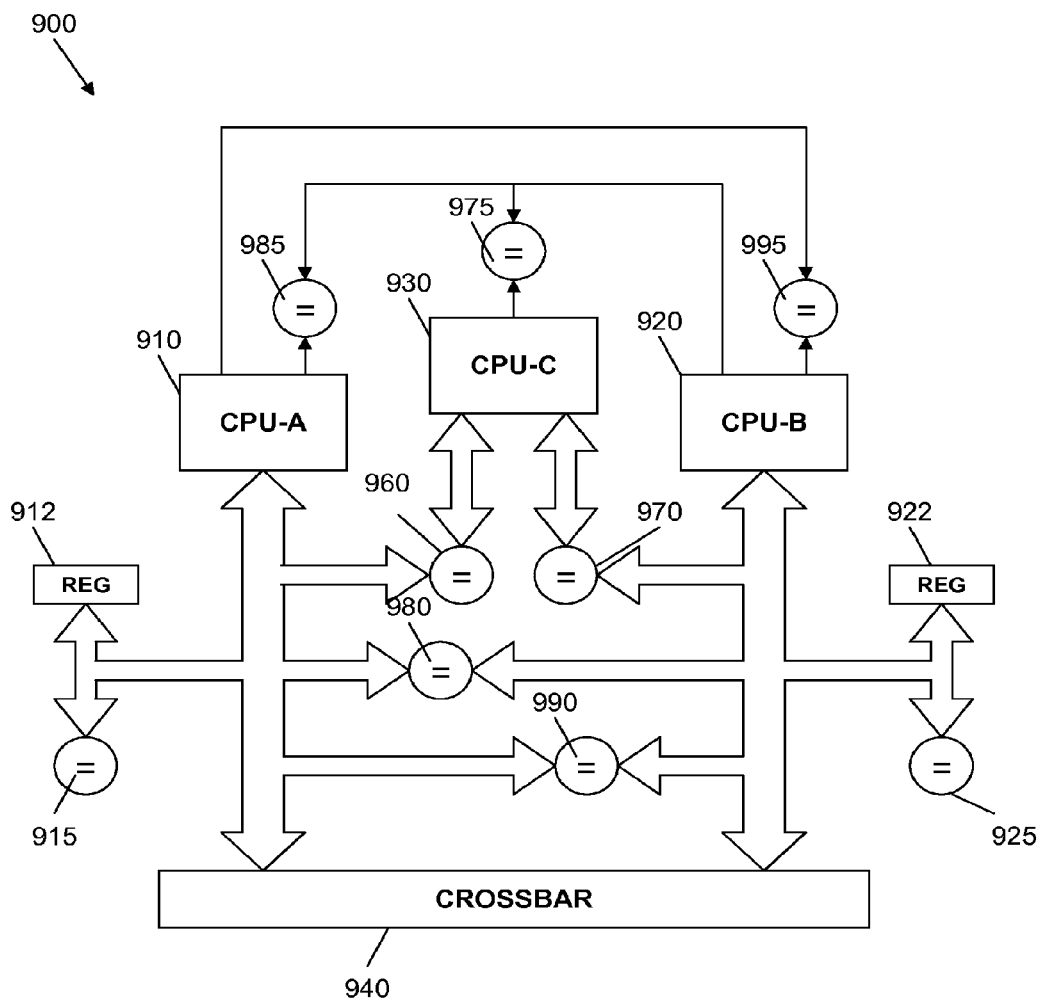

Referring now to FIG. 6A, there is illustrated part of a system architecture 900 according to an alternative embodiment of the present invention. This architecture illustrates one possible implementation of using three masters to implement a vote mechanism as part of the overall system architecture 100 described in FIG. 1. The system architecture 900 comprises a first master element, in a form of CPU-A 910, a second master element, in a form of CPU-B 920, and a third master element, in a form of CPU-C 930. The system 900 further comprises a communication element in a form of a crossbar switch 940. The crossbar switch 940 is arranged to operably couple CPU-A 910 and CPU-B 920 to one or more slave elements (not shown).

The system architecture 900 further comprises access validation registers 912, 922, operably coupled to CPU-A 910 and CPU-B 920 respectively, generally located between the crossbar switch 940 and CPU-A 910 and CPU-B 920 respectively. In this manner, when either of CPU-A 910 and/or CPU-B 920 sends access information and/or data to be written to a slave element, the corresponding access validation register 912, 922 records the access information and/or data to be written. Upon receipt of access information and/or data to be written, each access validation register 912, 922 provide validation information relating to the recorded access information and/or data to be written, over a validation path (not shown).

The system architecture 900 further comprises read comparator 915, 925, operably coupled to CPU-A 910 and CPU-B 920 respectively, located generally between the crossbar switch 940 and CPU-A 910 and CPU-B 920 respectively. In this manner, when either of CPU-A 910 and/or CPU-B 920 receives data from a slave element, the corresponding read comparator 915, 925 also receives the data. Each read comparator 915, 925 is further coupled to a validation path (not shown) such that, upon receipt of data, the read comparator 915, 925 is able to validate the data using validation information provided over the validation path.

For the embodiment illustrated in FIG. 6A, CPU-C 930 is not provided with write access to the crossbar switch 940, and as such is unable to access data, or the like, from slave elements. Instead, data and the like received by CPU-A 910 is provided to CPU-C 930. In this manner, CPU-C 930 receives similar data etc. as CPU-A 910. Additionally, read and write requests from CPU-C 930 are provided to a comparator 970. Comparator 970 is also provided with read and write request from CPU-B 920. In this manner, comparator 970 compares read and write requests from CPU-B 920 and CPU-C 930, in order to detect any inconsistencies therebetween.

The system architecture 900 further comprises comparators 980 and 990, located generally between the communication paths provided between CPU-A 910 and the crossbar switch 940 and between CPU-B 920 and the crossbar switch 940. In this manner, comparators 980 and 990 are able to compare read and write requests from, and data returned to, CPU-A 910 and CPU-B 920.

It is worth noting that this architecture is able to identify the failing CPU. To assert there is no single point of failure an additional comparator 960 may be added that compares results of CPU-A 910 and CPU-C 930. It is also required to duplicate both comparators 960 and 970 similar to the comparator pair 980/990 to assert that these comparators are not a single point of failure. With this extension, it will be possible to clearly identify a failing CPU or comparator and enable an appropriate countermeasure.

As will be appreciated by a skilled artisan, when either of comparators 980 and/or 990 detects an inconsistency between read/write requests made by CPU-A 910 and CPU-B 920, an error has been detected. If comparator 970 also detects an inconsistency between the read/write requests made by CPU-B 920 and CPU-C 930, it can be assumed that CPU-B 920 has made the error, and as such the location of the error can be determined. Conversely, if comparator 970 does not also detect an inconsistency between the read/write requests made by CPU-B 920 and CPU-C 930, it can be assumed that CPU-A has made the error, and as such the location of the error can also be determined.

The following table shows possible ways of identifying a cause of a failure with this methodology. As can be shown by this table the first two columns are sufficient to identify the failing CPU.

|  | Comparator 990/980 | Comparator pair 970 | Comparator pair 960 |
| --- | --- | --- | --- |
| CPU-A 910 failure | diff | same | diff |
| CPU-B 920 failure | diff | diff | same |
| CPU-C 930 failure | same | diff | diff |

The third column and the duplication of the comparators 970 and 960 can be used to identify a failing comparator and to avoid false errors caused by a failing comparator. When there is a difference between the comparators in a comparator pair, then this identifies a failing comparator.

As will be appreciated by a skilled artisan, by providing a third master element, which for the illustrated embodiment is in the form of CPU-C 930, a 'majority vote' provides a means for identifying when an error occurs, and more particular for identifying in which device the error has occurred.

Access to internal storage elements of each of the master elements, for example register files, control registers, etc, may also be compared for validation purposes, for example via validation elements 975, 985, 995, in addition to validation of external read/write operations from/to slave elements, etc. In this manner, an improved safety integrity level may be achieved within the system.

The alternative embodiment described in FIG. 6A illustrates that adding a third master element, like the CPU-C 930, does not alter the remaining architecture; basically the architecture is agnostic to the actual number and configuration of redundant masters.

Figure 6B:
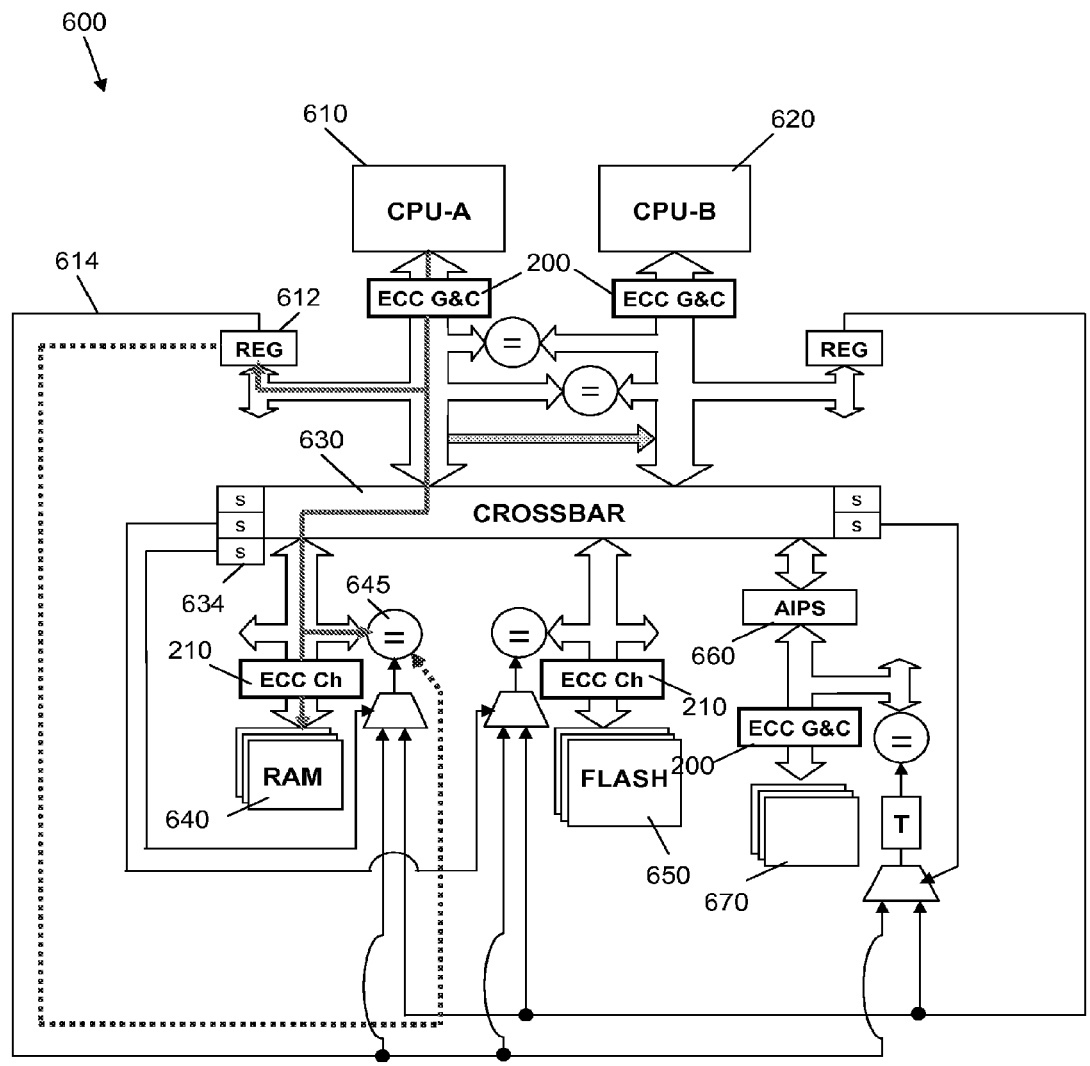

Referring now to FIG. 6B the example of a system 600 shown therein comprises a first master element and a second master element, which for the illustrated embodiment are in a form of CPU-A 610 and CPU-B 620 respectively. In one embodiment of the invention, the CPU may be considered as a data source capable of generating new data. The system 600 further comprises a shared communication element, which for the illustrated embodiment is in a form of a crossbar switch 630, arranged to operably couple CPU-A 610 and CPU-B 620 to one or more slave element. For the illustrated embodiment, the system 600 comprises a first slave element in a form of RAM 640, a second slave element in a form of FLASH memory 650, and an bus bridge ATPS 660, via which one or more peripheral slave element(s) 670 may be operably coupled to the crossbar switch. In one embodiment of the invention, the slave elements, for example in a form of RAM, may be considered as a data sink capable of generating new data.

The system is arranged to operate in a first, independent mode, wherein CPU-A 610 and CPU-B 620 operate substantially independently of one another, and a second, redundant mode, wherein the CPU-A 610 and CPU-B 620 perform similar load/store operations, one providing redundancy for the other.

For the embodiment illustrated in FIG. 6B, the system further comprises Error Correction Code (ECC) components, arranged to provide error detection and correction capabilities for data transferred between master and slave elements. For the illustrated embodiment, the ECC components are in a form of ECC Generation and Checking (ECC G&C) elements 200 and 220, and ECC Checking Only (ECC Ch) elements 210. In general, units having support for ECC generation are required for any source of new data (e.g. processor cores or other master devices, peripheral blocks interfacing with the external world), while units having only checking capabilities are sufficient for blocks that can/will not generate new data (e.g. passive devices like memories). The ECC G&C elements 200 may be located between any bus master (e.g. CPU-A 610, CPU-B 620) and the crossbar switch 630. ECC G&C elements 220 may be located between the peripheral slave elements 670 and a bus bridge (e.g. ATPS) 660 or in general between slave elements and the crossbar switch 630 in case there is no bus bridge required. ECC Ch elements 210 are located between slave elements, e.g. RAM 640 and FLASH 650, and the crossbar switch 630.

ECC Ch elements may be a reduced and cheaper version of a ECC G&C, where the ECC generation capability has been removed. Therefore ECC G&C elements can generate and check ECC information, while ECC Ch elements can only check this kind of information. It should be noted that an ECC G&C block can always be used instead of a ECC Ch block. ECC elements may be attached to buses or the like, as opposed to being provided by master/slave elements themselves.

ECC information is accordingly generated at the source of new data; e.g. for write operations from master elements or for read operations from one or more peripheral slave element(s). Generated ECC information is always checked at its destination; e.g. at the RAM, Flash or peripheral slave elements for write operations or at the bus masters for read operations. Furthermore, ECC information retrieved from passive elements by read operations is checked by the local ECC Ch block prior to reaching the relevant master element (where it is checked again by the associated ECC G&C block). Passive elements (e.g. memories like RAM or Flash) do not generate ECC information but store the provided ECC data additionally to the provided raw data.

FIG. 6B illustrates a write operation performed by CPU-A 610, for example when the system 600 is operating in a first, independent mode. Data to be written to, for example, RAM 640 is sent by CPU-A 610 to the crossbar switch 630. The ECC G&C element 200 associated with CPU-A 610 generates ECC information for the data to be written, which is added to the information being sent to the crossbar 630. The data and ECC information is then routed through the crossbar switch 630 and, for the illustrated embodiment, access validation register 612, which records validation information for the data and ECC information and forwards it to the comparator 645.

The crossbar switch 630 routes the data and ECC information to RAM 640. The data and ECC information is received by write comparator 645, which validates the data and ECC information with the validation information received from access validation register 612. In this manner, the access validation register 612 and write comparator 645 provide a first form of redundancy to the primary data path between, for the illustrated example, CPU-A 610 and RAM 640, in terms of validating the conveyance of data there between.

The data and ECC information is further received by the ECC Ch unit 210, which performs a check of the data using the provided ECC information to detect, and if possible correct, any errors that may have occurred during conveyance of the data. In this manner, the ECC elements 200, 210, 220 provide a further form of redundancy to the primary data path, in terms of error detection and correction of data. An advantage of providing a further form of redundancy to the primary path is that, not only may any problems within the primary data path be detected, but also that any associated redundancies enable problems with each other to be detected and exactly located.

The data and ECC information are received by, for the illustrated example, RAM 640 and stored therein. Any read request at a later point in time for the corresponding data (e.g. again performed by CPU-A 610) will provide the data along with the associated ECC information. The ECC Ch unit 210 associated with the RAM 640 can immediately validate the data being read using the corresponding ECC information; similar applies to the ECC G&C unit 200 associated with the CPU-A 610 when it has been routed back by the crossbar 630. ECC Ch unit 210 can correct the data being read using the related ECC information (in case of single bit errors of the data occurred while storing it), or can opt to only supply the related status information without correcting the data. Therefore it can detect and immediately correct any single bit failures arising since the last store operation to the corresponding memory address. ECC G&C unit 200 will always correct any single bit failure detected on read information (which might have been caused by a RAM failure—if not corrected by the ECC Ch unit 210—or a failure of the crossbar switch 630).

Using ECC units in the manner described above permits the exact localization of an error, e.g. using ECC creation and checkers at the source and destination of a data transfer; for example an error in the RAM 640 can be flagged by the ECC Ch unit 210 when reading the affected memory locations, while an error in the crossbar switch can be flagged by the ECC G&C unit 200 when reading. Furthermore, the accumulation of errors can be prevented (a single bit error in the RAM 640, with a second single bit error caused by the crossbar 630 could result in a non-recoverable double bit error) by immediate correction of the erroneous data. Also, an error that is correctable can be clearly isolated and distinguished from redundancy errors, which will ultimately result in better overall system availability, since not any redundancy failure will immediately cause a system fault.

For the embodiment illustrated in FIG. 6B, separate ECC Ch elements 210 are provided for RAM 640 and FLASH 650. However, in an alternative embodiment, an ECC Ch element may be provided for a plurality of slave elements, wherein data to/from the slave elements is conveyed by, for example, a single bus or other communication element, or where separate communication elements for each slave unit are routed through a common ECC Ch element.

Although master elements for the illustrated embodiments have been in the form of CPUs, the system may be applied to alternative bus master elements, for example coprocessors, Direct Memory Access (DMA) controllers, FlexRay™ controllers etc. For clarity, FlexRay is an automotive network communications protocol developed by the FlexRay Consortium (www.flexray.com).

Also, intermediary checkpoints may be provided along the primary data paths and redundancy/validation paths to provide increased safety integrity levels. Furthermore, it is contemplated that a single or replicated fault detection unit may be provided that receives information from the various validation/redundancy elements within the system, and upon detection of problems/errors determines possible locations and causes of such problems/errors together with, in some embodiments, determining the most appropriate means for counteracting the cause.

Some or all of the slave elements, for example RAM memory elements, may also be configurable to operate in a first, independent mode and a second, redundant mode. In this manner, providing redundancy for RAM memory may further enhance the safety integrity level provided by the system. Alternatively, greater performance of the system may be required, whereby RAM memory may be configured to operate independently, thereby providing increased RAM size.

Figure 7:
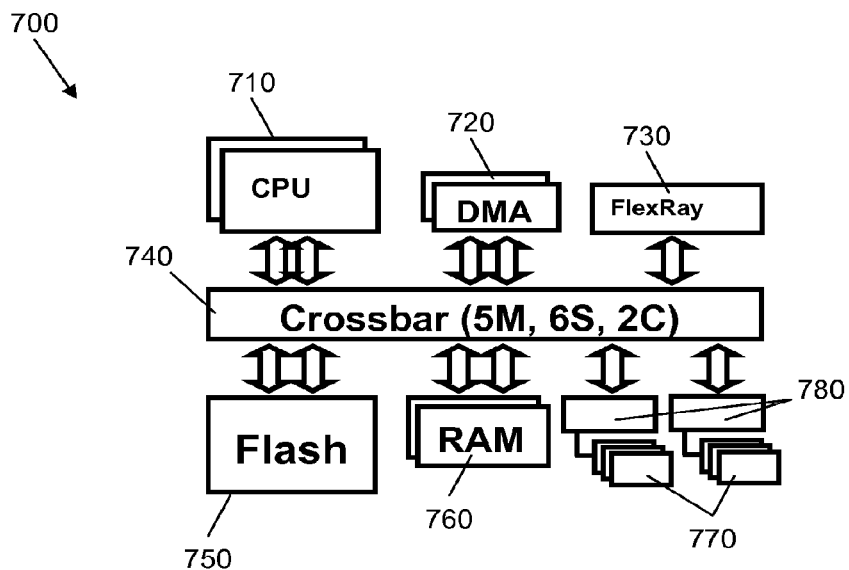
FIG. 7 and FIG. 8 shows an architecture illustrating an example of an embodiment of a system according system in accordance with the invention in different modes.
Figure 8:
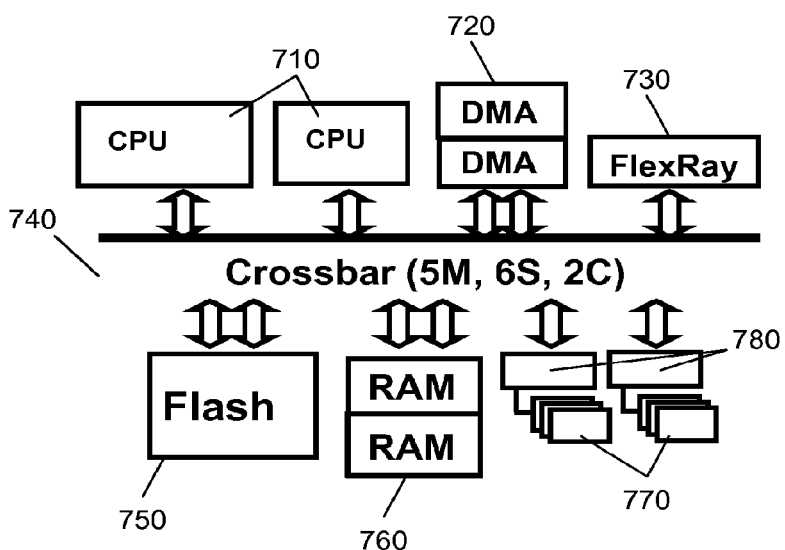

Referring now to FIG. 7 and FIG. 8, the system shown therein may be configured to operate, during a first period of time, in the first, redundant mode (shown in FIG. 7) providing a high level of safety integrity; and be configured to operate, during a second period of time not overlapping with the first period of time, in the second, independent mode (shown in FIG. 8). The system 700 shown in both figures comprises five bus master elements in the form of two CPUs 710, two DMA controllers 720 and a single FlexRay unit 730. It further comprises a shared communication element in a form of a crossbar switch 740. For the illustrated embodiment, the crossbar switch 740 comprises five master ports and six slave ports, and permits two concurrent accesses. The system 700 further comprises slave elements in a form of a FLASH memory 750 comprising two read ports, two RAM memory elements 760 and two peripheral slave elements 770 coupled to the crossbar switch 740 via bus bridges ATPS 780.

In redundant mode, as shown in FIG. 7, both CPU's 710 are configured to work in "Lock-Step" mode, and occupy only one of the master ports. Similarly, the DMA controllers 720 are also configured to work in "Lock-Step" mode, and occupy also only another one of the master ports. Besides those masters providing redundancy, a third master port is used by the single FlexRay controller 730 without any redundancy. Furthermore the RAM memory elements 760 are configured to operate in redundant mode with one another, the second RAM mirroring all accesses to the first one. Since the crossbar 740 supports two concurrent accesses, there will be very few contentions in such a system where only three master ports are in usage. In this manner, as will be appreciated by a skilled artisan, a high level of horizontal redundancy is provided throughout the system 700. Furthermore, vertical redundancy may also be provided for data paths etc, for example in a form of validation paths, ECC elements, etc., as described above.

Referring now to FIG. 8, the system 700 of FIG. 7 is illustrated with the system configured to operate in a second mode, wherein the system provides a lower level of safety integrity by reducing the amount of redundant elements, but providing improved performance.

For the configuration of system 700 illustrated in FIG. 8, the CPUs 710, DMA controllers 720 and RAM memory elements 760 are configured to operate independently. In this manner, overall system performance is improved due to substantially double CPU performance, substantially double the number of DMA channels enabling faster response since two channels may be active in parallel, and the double amount of available RAM size. Although for the configuration of system 700 illustrated in FIG. 8 horizontal redundancy has been substantially reduced, vertical redundancy may still be provided for data paths etc, for example in a form of validation paths, ECC elements, etc., as described above. Basically, when using the architecture and novel mechanisms described earlier, the system provides still the same amount of redundancy for the system connectivity and data transmissions within the system, only the redundancy for the various elements of the system has been reduced. It is worth to note that a certain safety integrity level can still be achieved in such a system for particular elements, e.g. by a core self-test mechanism for processor cores or similar means for other blocks.

As will be appreciated by a skilled artisan, the system 700 is not limited to the configurations illustrated in FIGS. 7 and 8, but rather may be configured in any variation of CPUs, DMA controllers and/or RAM memory elements being configured to operate in redundant or independent modes.

A configurable system may have provide A system architecture capable of being configured to provide a plurality of safety integrity levels and/or a reduced development costs for systems capable of being used in a plurality of applications requiring a plurality of safety integrity levels and/or redundancy as an object property, as opposed to being defined by the system architecture, thereby enabling greater flexibility in the configurability of the system and/or data path redundancy decoupled from master/slave element redundancy, thereby enabling horizontal and vertical redundancies to be configured separately from one another.

Also, the system may be applied by a semiconductor manufacturer to any integrated circuit architecture supporting a system required to provide a safety integrity level. It is further envisaged that, for example, a semiconductor manufacturer may employ the inventive concept in a design of a stand-alone device, or application-specific integrated circuit (ASIC) and/or any other sub-system element.

It will be appreciated that any suitable distribution of functionality between different functional units or controllers or memory elements, may be used without detracting from the inventive concept herein described. Hence, references to specific functional devices or elements are only to be seen as references to suitable means for providing the described functionality, rather than indicative of a strict logical or physical structure or organization. By way of example, validation registers and comparators coupled to master and/or slave elements have been illustrated and described as separate functional elements of the system. However, validation registers and comparators may be provided within combined functional elements. For example, for the system 100 of FIGS. 1 to 5, access validation register 112 and read comparator 115 may be provided within a combined functional element.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

The invention claimed is:

1. A system comprising:
a first processor;
a communication path between the first processor and a slave element, the communication path including a communication element coupled to the first processor and to the slave element;
a first validation path between the first processor and the slave element, the first validation path being separate from the communication path and from the communication element, and including a first validation element arranged to validate a first access request by the first processor to the slave element; and
a second validation path between the first processor and the slave element, the second validation path being separate from the communication element, and including a second validation element arranged to validate a response to the access request from the slave element to the first processor.

2. The system of claim 1 comprising:
a second processor, wherein the communication path is further between the second processor and the slave element; and
a third validation path between the second processor and the slave element, the third validation path including a third validation element arranged to validate a second access request by the second processor to the slave element.

3. The system of claim 2 wherein the first processor and the second processor are configurable to operate in both of the following modes:
a first mode where the first processor and the second processor operate independently of one another, and
a second mode where the second processor performs an operation typically performed by the first processor.

4. The system of claim 3 wherein the third validation element is arranged to validate operations performed by the first processor with operations performed by the second processor when the first processor and the second processor are configured to operate in the second mode.

5. The system of claim 3 wherein the second processor is decoupled from the communication element when operating in the second mode.

6. The system of claim 3 comprising a bypass element arranged to forward an access request response between the first processor and the second processor when the first processor and the second processor are configured to operate in the second mode.

7. The system of claim 6 wherein the system transitions from the second mode of operation to the first mode of operation based on at least one of the following operations:
disabling a decoupling of the second processor from the communication element;
switching off the horizontal validation element; and
switching off the bypass element.

8. The system of claim 2 wherein:
the second access request is one of a read access request and a write access request routed from the first processor or the second processor over the communication element to the slave element; and
the system further comprises a request validation path arranged to provide redundancy for the second access request by transferring access request validation information from the first processor or the second processor to the slave element.

9. The system of claim 8 wherein the access request validation information comprises at least one of:
a copy of access information;
a portion of access information; and
a derivative of access information.

10. The system of claim 9 further comprising a fourth validation element operably coupled to the slave element and to a fourth validation path, the fourth validation element being arranged to validate data transferred along a primary data path using access validation information provided by the fourth validation path.

11. The system of claim 1 wherein:
a response to the first access request is routed from the slave element over the communication element to the first processor; and
in validating the response to the access request, the second validation element is further arranged to provide redundancy by transferring access response validation information from the slave element to the first processor.

12. The system of claim 11 wherein the access response validation information comprises at least one of:
a copy of access information;
a portion of access information; and
a derivative of access information.

13. The system of claim 12 further comprising an access response validation register, operably coupled to a third validation path and to the slave element, the access response validation register being arranged to store the access response validation information.

14. The system of claim 12 further comprising:
a third validation element operably coupled to the first processor, the third validation path being arranged to validate data transferred along a primary data path using access validation information provided by the third validation path.

15. The system of claim 9 wherein the access validation information is presented at a fourth validation path to decouple a time of validation of a transaction from a time of actual data transmission.

16. The system of claim 1 wherein the first processor comprises one of a central processing unit (CPU), and a Direct Memory Access (DMA) controller.

17. A system comprising:
a data source capable of generating data;
a data sink operably coupled to the data source by a data path and capable of receiving the generated data;
a first Error Correction Code (ECC) unit operably coupled to the data source and arranged to add check information to data generated by the data source;
a second ECC unit operably coupled to the data sink and arranged to verify generated data and check information provided to the data sink; and
a validation path separate from the data path and including comparison logic operably coupled to the first ECC unit and the second ECC unit and arranged to identify a faulty system element by comparing error information received from at least one of the first and second ECC units and a further data validation element.

18. The system of claim 17 wherein the comparison logic is arranged to both identify and locate the faulty system element.

19. A system comprising:
a processor;
a slave device;
a crossbar switch coupled to the processor and to the slave device, the crossbar switch being operable to route a transaction between the processor and the slave device;
a validation register operable to store at least a portion of the transaction as received by the slave device in response to the transaction being communicated between the crossbar switch and the slave device; and
a comparator coupled to a bus between the processor and the crossbar switch, and to the validation register, the comparator being operable to provide an indication when contents of the validation register are different from data on the bus.

* * * * *